United States Patent
Sumiya et al.

(10) Patent No.: US 12,125,507 B2
(45) Date of Patent: Oct. 22, 2024

(54) HARD DISK DRIVE BREATHER FILTER ENABLING SORBENT REPLACEMENT

(71) Applicant: Western Digital Technologies, Inc., San Jose, CA (US)

(72) Inventors: Takeji Sumiya, Fujisawa (JP); Shin Nagahiro, Fujisawa (JP); Hitoshi Tamura, Fujisawa (JP); Naoki Hirayama, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/222,872

(22) Filed: Jul. 17, 2023

(65) Prior Publication Data

US 2024/0144979 A1 May 2, 2024

Related U.S. Application Data (60) Provisional application No. 63/419,659, filed on Oct. 26, 2022.

(51) Int. Cl.
  *G11B 33/14* (2006.01)
(52) U.S. Cl.
  CPC .................. *G11B 33/146* (2013.01)
(58) Field of Classification Search
  None
  See application file for complete search history.

(56) References Cited

U.S. PATENT DOCUMENTS

| | | | | |
|---|---|---|---|---|
| 5,075,807 | A * | 12/1991 | Inoue | G11B 33/1453 360/99.15 |
| 5,367,417 | A * | 11/1994 | Brown | G11B 33/1486 360/97.18 |
| 5,590,001 | A * | 12/1996 | Ino | G11B 25/043 360/97.18 |
| 5,764,435 | A * | 6/1998 | Sugimoto | G11B 33/1486 360/97.18 |
| 6,296,691 | B1 * | 10/2001 | Gidumal | B01D 46/0032 96/135 |

(Continued)

FOREIGN PATENT DOCUMENTS

| | | | | |
|---|---|---|---|---|
| DE | 60003062 T2 | 4/2004 | | |
| WO | WO-02065474 A2 * | 8/2002 | ........... | G11B 25/043 |
| WO | WO2006137560 A1 | 12/2006 | | |

*Primary Examiner* — William J Klimowicz
(74) *Attorney, Agent, or Firm* — John D. Henkhaus (57) ABSTRACT

A sorbent breather filter for an electronic device such as a hard disk drive (HDD) is configured with a first chamber for housing a first sorbent and environmentally coupled with an external environment via at least a first orifice and a second orifice, a corresponding replaceable first sorbent such as zeolite or silica gel beads in the first chamber, a second chamber adjacent to the first chamber for housing a second sorbent, and a corresponding second sorbent such as carbon beads in the second chamber. The first orifice is a through-hole such that the first sorbent can be loaded into the first chamber therethrough, and the second orifice is a slitted or grated hole such that the first sorbent cannot move from the first chamber to the external environment through the second orifice while loading sorbent into the first chamber through an HDD first cover breather hole.

17 Claims, 6 Drawing Sheets

(56) References Cited

U.S. PATENT DOCUMENTS

| | | | |
|---|---|---|---|
| 6,395,073 B1* | 5/2002 | Dauber | B01D 39/1692 96/147 |
| 7,209,319 B1* | 4/2007 | Watkins | G11B 33/146 360/97.18 |
| 7,300,500 B2 | 11/2007 | Okada et al. | |
| 7,318,859 B2 | 1/2008 | Ball et al. | |
| 7,478,760 B2 | 1/2009 | Beattty et al. | |
| 7,486,474 B2* | 2/2009 | Shin | G11B 33/1446 360/97.18 |
| 8,033,304 B2* | 10/2011 | Tuma | B01D 46/0036 55/385.6 |
| 8,438,721 B1* | 5/2013 | Sill | G11B 33/1486 29/603.03 |
| 8,599,515 B2 | 12/2013 | Brown | |
| 8,864,884 B2* | 10/2014 | Tuma | B01D 46/0001 96/138 |
| 8,885,289 B2 | 11/2014 | Brown | |
| 10,971,195 B2* | 4/2021 | Kraus | B01D 53/261 |
| 2005/0036232 A1* | 2/2005 | Macpherson | G11B 33/146 360/97.18 |
| 2005/0047001 A1* | 3/2005 | Logan | G11B 33/146 360/97.18 |
| 2006/0032371 A1 | 2/2006 | Dauber et al. | |
| 2007/0230037 A1* | 10/2007 | Ichikawa | G11B 33/1486 360/97.18 |
| 2009/0025561 A1* | 1/2009 | Tuma | B01D 46/0001 96/151 |
| 2012/0204722 A1* | 8/2012 | Watkins | B03C 3/017 55/486 |

* cited by examiner

502 FOR A SORBENT BREATHER FILTER COMPRISING A FIRST CHAMBER ENVIRONMENTALLY COUPLED WITH AN ENVIRONMENT EXTERNAL TO AN HDD VIA A THROUGH-HOLE IN A CONTAINER OF THE BREATHER FILTER AND A GRATE-COVERED ORIFICE IN THE CONTAINER OF THE SORBENT BREATHER FILTER, AND A FIRST MEANS FOR ADSORBING IN THE FIRST CHAMBER:

APPLY A SUCTION FORCE TO THE FIRST THROUGH-HOLE VIA A COLLINEAR HOLE IN A FIRST COVER OF THE HDD, FROM THE ENVIRONMENT EXTERNAL TO THE HDD, TO REMOVE THE FIRST MEANS FOR ADSORBING FROM THE FIRST CHAMBER

↓

504 INJECT ANOTHER UNIT OF FIRST MEANS FOR ADSORBING INTO THE FIRST CHAMBER VIA THE FIRST THROUGH-HOLE, SUCH THAT THE GRATE-COVERED ORIFICE PROHIBITS ANY OF THE OTHER UNIT OF FIRST MEANS FOR ADSORBING FROM MOVING FROM THE FIRST CHAMBER TO THE ENVIRONMENT EXTERNAL TO THE HDD VIA THE GRATE-COVERED ORIFICE

FIG. 5

HARD DISK DRIVE BREATHER FILTER ENABLING SORBENT REPLACEMENT

FIELD OF EMBODIMENTS

Embodiments of the invention may relate generally to electronic devices, and particularly to approaches to an electronic device breather filter for which the internal sorbent is readily replaceable.

BACKGROUND

A hard disk drive (HDD) is an electronic non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, because the density of helium is one-seventh that of air. For example, operating an HDD in helium reduces the drag force acting on the spinning disk stack and the mechanical power used by the disk spindle motor. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDDs is also increased due to low humidity, less sensitivity to altitude and external pressure variations, and the absence of corrosive gases or contaminants.

Challenges remain in the manufacturing of helium-filled, sealed HDDs. For example, particulate contaminants may be introduced into an HDD during various phases of the manufacturing process, prior to hermetically sealing. Particulates can be especially troublesome inside an HDD, such as by causing scratches to a recording disk, slider flying height problems, and the like. Ultimately, particulates undesirably introduced into an HDD can cause an HDD failure. One approach to inhibiting the introduction of particulate contaminants within an HDD is to employ an absorbent/adsorbent breather filter (commonly referred to as "AB filter") within an HDD, where the AB filter operates at an interface between the internal environment of the HDD and the external ambient environment. In the context of a hermetically-sealed HDD, the AB filter can function to filter gases injected into the HDD during manufacturing processes, such as the dry air injected into the HDD during a humidity control process and/or the lighter-than-air gas (e.g., helium) injected into the HDD during the gas injection process. However, known AB filters are limited in their performance, especially in view of the duration of the manufacturing and testing procedures prior to sealing. Thus, those AB filters may need to be replaced prior to final HDD sealing, which imposes additional cost.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a breather filter for which the internal sorbent is readily replaceable, such as for an electronic device such as a hard disk drive (HDD), are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, may not be absolutely leak-free.

Context

Figure 2A:
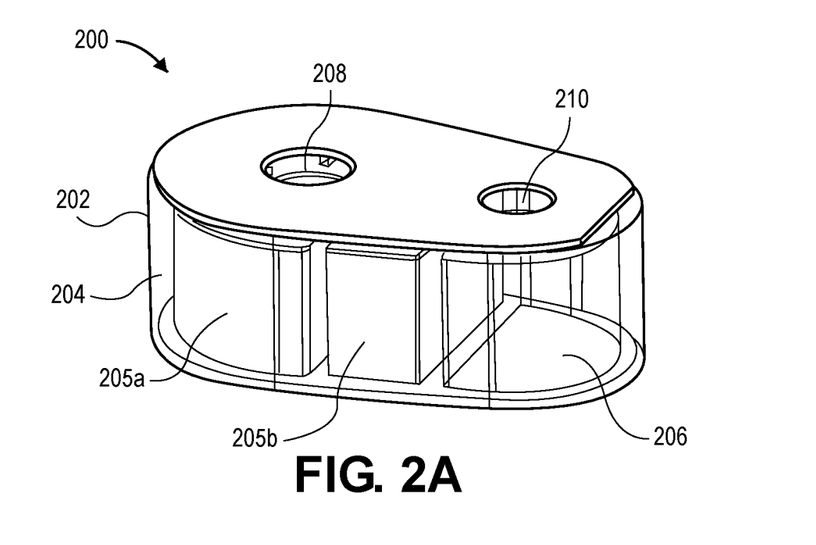
FIG. 2A is a perspective view illustrating an example breather filter for an HDD.
Figure 2B:
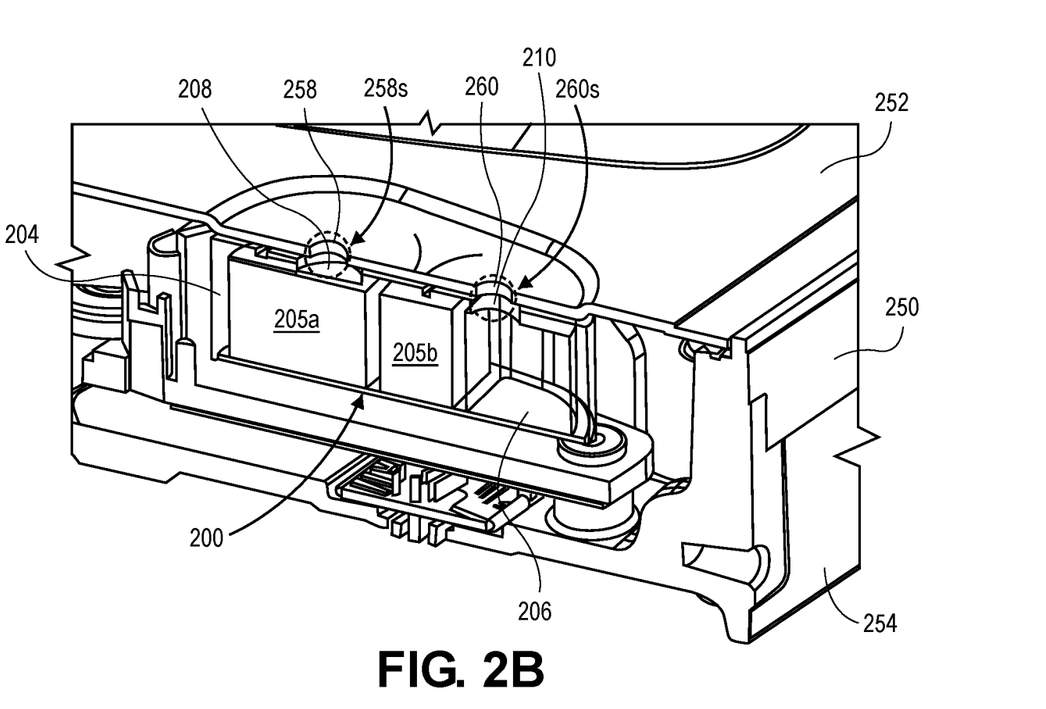
FIG. 2B is a cross-sectional view of the example breather filter of FIG. 2A installed in an HDD.

Recall that particulate contaminants may be introduced into an HDD during the manufacturing and testing processes, and that an absorbent/adsorbent breather filter ("AB filter") is commonly used to inhibit the introduction of such particulate contaminants into an HDD. FIG. 2A is a perspective view illustrating an example breather filter for an HDD, and FIG. 2B is a cross-sectional view of the example breather filter of FIG. 2A installed in an HDD. AB filter 200 comprises a container 202 housing a first compartment 204 housing a first adsorbent 205*a* (e.g., a zeolite tablet) and an adjacent second adsorbent 205*b* (e.g., a carbon tablet) and a second compartment 206. First compartment 204 can function as an inlet chamber configured for receiving an input gas via a corresponding inlet 208 and allowing such gas to pass through to the internal environment of the HDD 250. Adjacent to the first compartment 204, also within the filter container 202, is the second compartment 206 which can function as an outlet chamber where gas can pass through in order to exit the AB filter 200 to the external environment via a corresponding outlet 210. In the context of a hermetically-sealed HDD, the AB filter 200 can function to filter gases injected into the HDD during manufacturing processes, such as the dry air injected into the HDD during the humidity control process and/or the lighter-than-air gas (e.g., helium) injected into the HDD during the gas injection process. Generally, AB filter 200 is configured to receive input gas(es) from an external environment (i.e., external to an electronic device in which it may be installed) and to pass output gas from the electronic device internal environment to the external environment. Breather and/or other electronic device filters may be designed and configured to serve multiple functions, such as absorbing contaminants, adsorbing contaminants, controlling humidity, and the like. Further, the different functions may apply to contaminants generally and/or to specific types of contaminants, such as hydrocarbons, acids, etc.

One approach to manufacturing a hermetically-sealed HDD involves sealing a cover (typically a "second" cover, over a "first" cover) to an HDD enclosure base using laser welding, after various functional tests are completed. Thus, also depicted in FIG. 2B is a first cover 252 of the HDD 250 affixed to an enclosure base 254, where the first cover 252 is what commonly seals an air-filled HDD. With a hermetically-sealed HDD configured to contain helium or some other lighter-than-air gas, a second cover (not shown here) would be positioned over the first cover 252 and hermetically coupled (e.g., welded) to the base 254. First cover 252 of HDD 250 further comprises a breather hole 258 which corresponds to and is collinear with inlet 208 of an installed AB filter 200 and a breather hole 260 which corresponds to and is collinear with outlet 210 of AB filter 200. Typically, a temporary seal is used to seal each breather hole 258, 260 during various manufacturing and testing processes, such as seal 258*s* and seal 260*s* (shown here in dashed form, for clarity), respectively.

Recall further that conventional AB filters are limited in their performance and thus may need to be replaced prior to the final sealing of the HDD, incurring additional cost. For example, AB filters such as AB filter 200 may need to be scrapped and replaced because the internal sorbent(s) may become saturated during testing and cannot be sufficiently dried prior to final sealing when installed in the subject HDD. Furthermore, replacing an AB filter needs to be performed in a clean room environment because the subject HDD needs to be opened up, i.e., the first cover needs to be removed, thereby otherwise exposing the internal components to contaminants. Hence, it remains a challenge to manage the internal humidity of the HDD during manufacturing and testing and thus the humidity within an HDD that is ready for shipping.

Breather Filter Enabling Sorbent Replacement

Figure 3A:
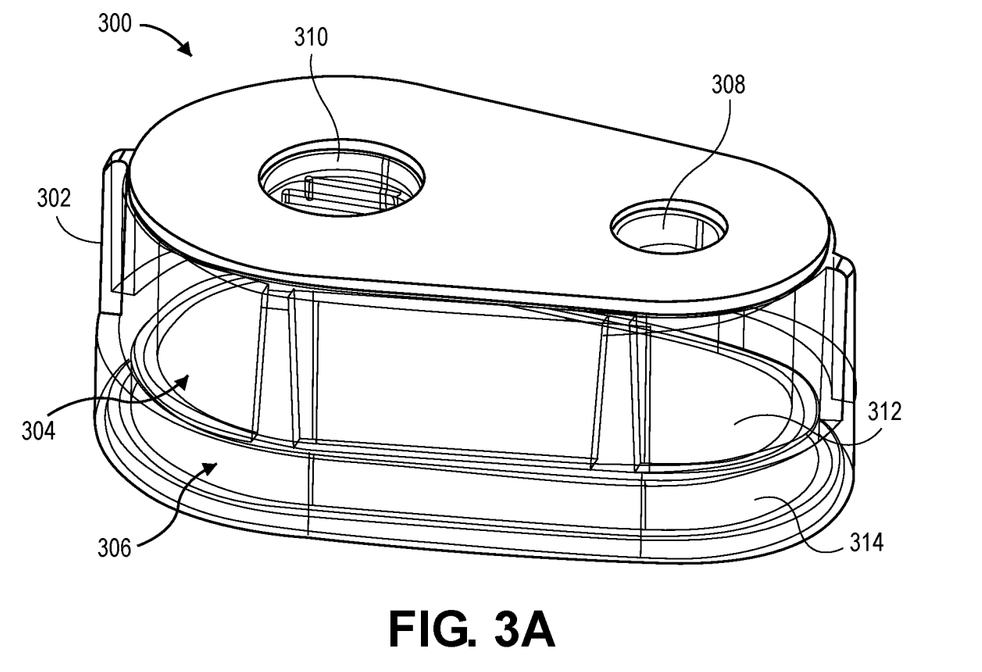
FIG. 3A is a perspective view illustrating a breather filter enabling replaceable sorbent, according to an embodiment.
Figure 3B:
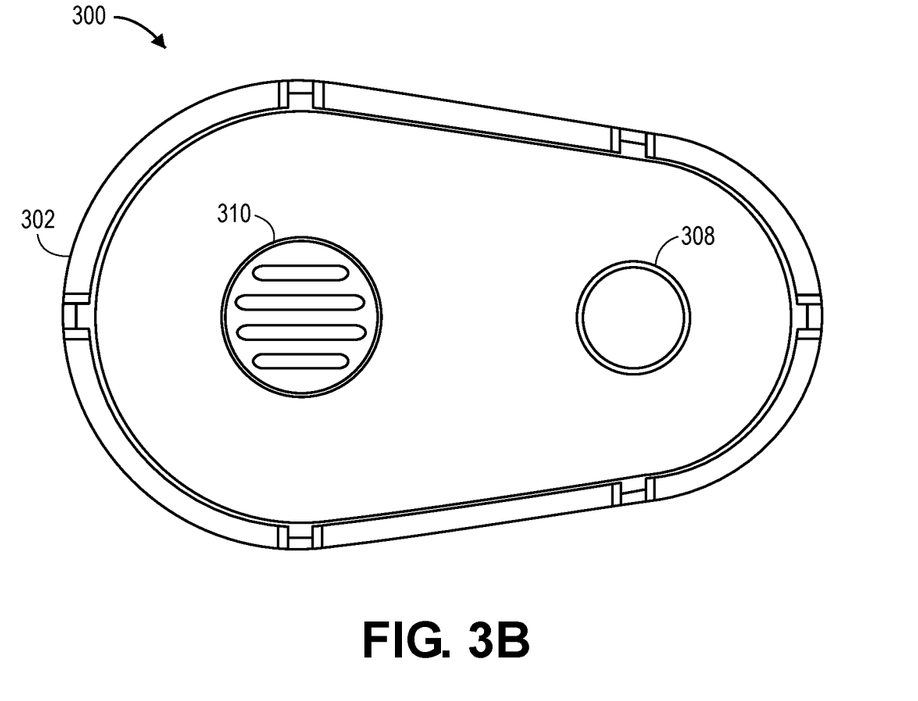
FIG. 3B is a top view illustrating the breather filter of FIG. 3A, according to an embodiment.
Figure 3C:
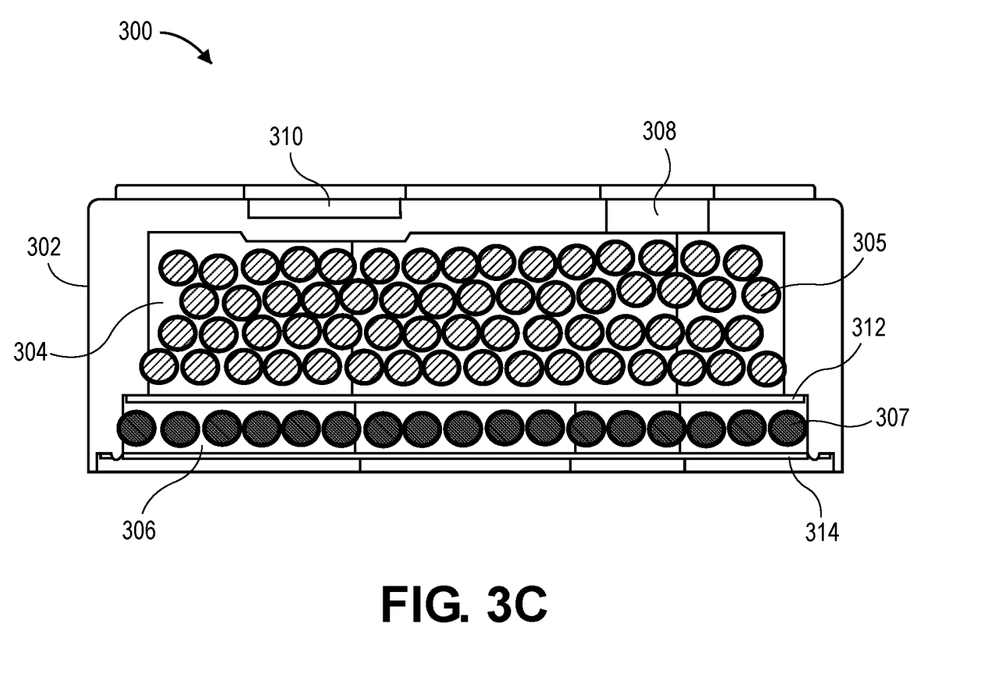
FIG. 3C is a cross-sectional side view illustrating the breather filter of FIG. 3A, according to an embodiment.

In view of the foregoing, it may be desirable to implement an AB filter in which the internal sorbent material is readily replaceable rather than needing to scrap and replace the complete AB filter unit in a clean room environment. FIG. 3A is a perspective view illustrating a breather filter enabling replaceable sorbent, FIG. 3B is a top view illustrating the breather filter of FIG. 3A, and FIG. 3C is a cross-sectional side view illustrating the breather filter of FIG. 3A, all according to an embodiment. A sorbent is defined as a substance which has the property of collecting molecules of another substance by sorption, i.e., by absorption (e.g., absorbing or taking in another substance) or adsorption (e.g., taking up and holding or adhering molecules of another substance). Thus, the term "sorbent" is used herein to characterize either or both of an adsorbing or absorbing material.

Sorbent breather filter 300 (or "absorbent/adsorbent breather filter" or "adsorbent breather filter" or "AB filter") comprises a container 302 enclosing a first chamber 304 or compartment for housing a first adsorbent 305 (and/or absorbent) and a second chamber 306 or compartment for housing a second adsorbent 307 (and/or absorbent). Generally, AB filter 300 is configured to receive input gas(es) from an external environment (e.g., the environment external to the HDD or other electronic device in which it is installed) and to pass output gas from the electronic device internal environment (e.g., the environment internal to the HDD or other electronic device in which it is installed) to the external environment. According to an embodiment, AB filter 300 is designed and configured for installation in a hard disk drive (HDD), similar to how the AB filter 200 is installed in HDD 250 in FIG. 2B. Hence, AB filter 300 further comprises, and is environmentally coupled to or interfaced with the external environment when in its operational position within an HDD, by way of a first orifice 308 and a second orifice 310. As discussed and which is the case here, breather and/or other electronic device filters may be designed and configured to serve multiple functions, such as absorbing contaminants, adsorbing contaminants, controlling humidity, and the like, and the different functions may apply to contaminants generally and/or to specific types of contaminants, such as hydrocarbons, acids, etc.

With reference again to FIG. 2B, breather hole 258 of the first cover 252 of HDD 250 would correspond to and would be collinear with second orifice 310 of an installed AB filter 300 and the breather hole 260 of the first cover 252 would correspond to and would be collinear with first orifice 308 of AB filter 300. As discussed, a temporary seal is commonly used to seal each breather hole 258, 260 during various manufacturing and testing processes, such as seal 258s and seal 260s, respectively. In a hermetically-sealed HDD utilizing a second cover welded or otherwise hermetically attached to the base 254, the internal environment would refer to the environment within the first cover and enclosure base and the external environment would refer to the environment between the first and second covers. Prior to hermetically sealing such an HDD, the internal environment would still refer to the environment within the first cover and enclosure base and the external environment would refer to the ambient environment external to the first cover. The lower, bottom, second chamber 306 is below the upper, top, first chamber 304 (in the position depicted in FIGS. 3A, 3C and as typically installed in an HDD, with the HDD base positioned below the HDD cover) and, therefore, the second chamber 306 is adjacent to the first chamber 304 in a direction from the external environment to the internal environment. The first and second chambers 304, 306 function as inlet chambers configured for receiving an input gas via the first and/or second orifices 308, 310, and allowing such gas to pass through to the internal environment of the subject electronic device, e.g., HDD 250. Likewise, first and second chambers 304, 306 function as outlet chambers where gas can pass through in order to exit the AB filter 300 to the external environment via the first and/or second orifices 308, 310. For example, in the context of a hermetically-sealed HDD, the AB filter 300 can function to filter gases injected into the HDD during manufacturing processes, such as the dry air injected into the HDD during the humidity control process and/or the lighter-than-air gas (e.g., helium) injected into the HDD during the gas injection process.

With reference to FIG. 3C, the first chamber 304 is configured for housing a first sorbent 305, and the second chamber 306 is configured for housing a second sorbent 307. According to an embodiment, the first sorbent 305 comprises or is composed of a zeolite material in the form of beads (i.e., zeolite beads) and the second sorbent 307 comprises or is composed of a carbon material in the form of beads (i.e., carbon beads, which enable more efficient airflow through the first and second chambers 304, 306 in contrast to carbon tablet of AB filter 200 of FIGS. 2A-2B). According to another embodiment, the first sorbent 305 comprises or is composed of a silica gel material, and may also be in the form of beads or pellets. According to an embodiment, the first orifice 308 is configured as a through-hole interface between the external environment and the first chamber 304, such that the first sorbent 305 can be loaded into the first chamber 304 via the through-hole first orifice 308. According to an embodiment and as depicted and viewed most clearly in FIGS. 3A-3B, the second orifice 310 is configured as a slitted-hole interface (i.e., having one or more relatively long narrow openings) between the external environment and the first chamber 304, such that the first sorbent 305 cannot move from the first chamber 304 to the external environment via the slitted-hole second orifice 310 while loading the first sorbent 305 into the first chamber 304, which is illustrated and described in more detail in reference to FIG. 4. The second orifice 310 may also be envisioned and referred to as a grate or grating, i.e., a partition, covering, or frame of parallel bars or crossbars, or grate-covered orifice or hole. Note also that the configuration of the second orifice 310 may vary from implementation to implementation, in keeping with the functionality of the second orifice 310 to enable the passing of gas therethrough while prohibiting the passing of solid sorbent material/beads therethrough. For a non-limiting example, the second orifice 310 may be configured in a lattice form, or the like, and serve the intended purpose.

According to an embodiment, AB filter 300 further comprises a sheet filter 312 positioned between, and at least in part forming, the first and second chambers 304, 306. Sheet filter 312 provides a structural barrier between the first and second chambers 304, 306 so that their respective contents 305, 307 do not mix, and may also function as a screening, filtering material. According to an embodiment, AB filter 300 further comprises another sheet filter 314 between the second chamber 306 and the internal environment to which AB filter 300 is environmentally coupled. Sheet filter 314 provides a structural barrier to close out the second chamber 306 to hold or house the corresponding contents 307 and may also function as a screening, filtering material.

Method of Refilling a Sorbent Breather Filter

Figure 4:
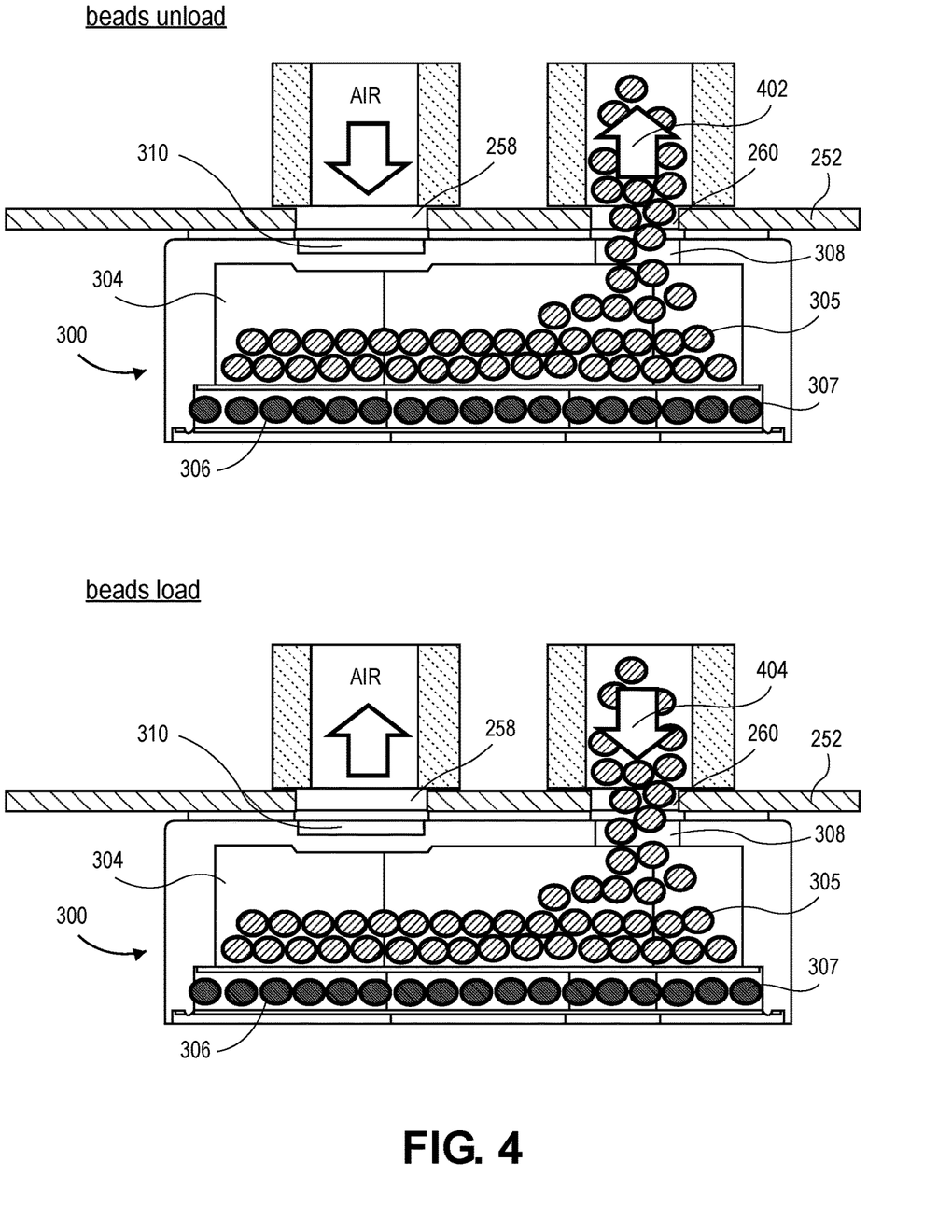
FIG. 4 includes cross-sectional side views illustrating the loading and unloading of the breather filter of FIG. 3A, according to an embodiment.
Figure 5:
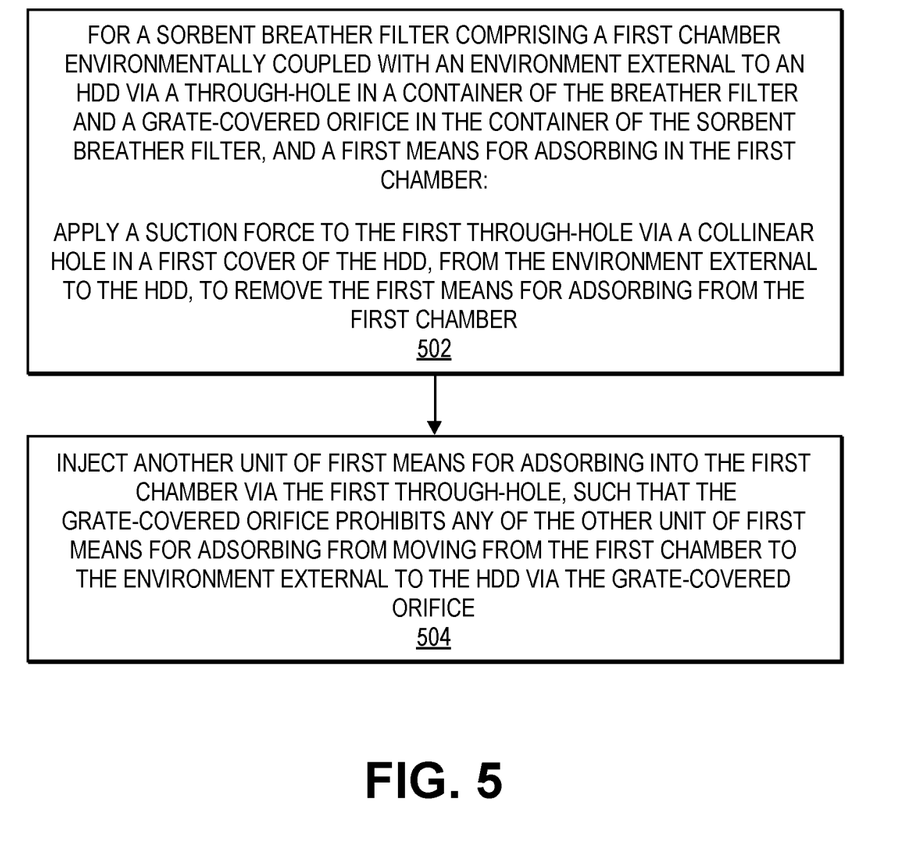
FIG. 5 is a flow diagram illustrating a method for refilling a sorbent breather filter inside an HDD, according to an embodiment.

FIG. 4 includes cross-sectional side views illustrating the loading and unloading of the breather filter of FIG. 3A, according to an embodiment, and FIG. 5 is a flow diagram illustrating a method for refilling a sorbent breather filter inside an HDD, according to an embodiment. Following, the "beads load" and "beads unload" procedures depicted in FIG. 4 are presented as examples of the method of FIG. 5. The method of FIG. 5 is described in the context of a sorbent breather filter comprising a first chamber environmentally coupled with an environment external to the HDD via a through-hole in a container of the breather filter and a grate-covered orifice in the container of the sorbent breather filter, and a first means for adsorbing in the first chamber.

At block 502, apply a suction force to the first through-hole, from the environment external to the HDD, to remove the first means for adsorbing from the first chamber. For example and with reference to top portion of FIG. 4 (beads unload), suction 402 (depicted as block arrow) is applied (e.g., via an external vacuum hose) to the through-hole first orifice 308 of the AB filter 300 through the collinear breather hole 260 of the first cover 252 of HDD 250 (FIG. 2B), thereby removing the first sorbent 305 (e.g., humidified zeolite beads) from the first chamber 304. According to this suction procedure, air from the external environment outside of first cover 252 naturally flows into the AB filter 300 via the grate-covered second orifice 310. According to an embodiment, one or more temporary seal (e.g., temporary seals 258s, 260s of FIG. 2B) covering the breather holes 258, 260 in the first cover 252 is removed prior to applying the suction force 402 at block 502.

At block 504, inject another unit of first means for adsorbing into the first chamber via the first through-hole, such that the grate-covered orifice prohibits any of the other unit of first means for adsorbing from moving from the first chamber to the environment external to the HDD via the grate-covered orifice. For example, another unit, set, group of the first sorbent 305 (e.g., dry zeolite beads) is injected 404 (depicted as block arrow) into the first chamber 304 via the through-hole first orifice 308, such that the grate-covered second orifice 310 prohibits any of the new first sorbent 305 from moving from the first chamber 304 to the environment external to the HDD via the grate-covered second orifice 310, even though air from the internal environment flows out from the AB filter 300 via the grate-covered second orifice 310. Hence, the first sorbent 305 can be replaced before hermetically sealing the HDD, to ensure the desired humidity level within the completed HDD.

According to an embodiment, at least in part because AB filter 300 comprises a second chamber 306 or compartment between the first chamber 304 and the internal environment of the HDD 250, and the second chamber 306 contains a second sorbent 307 of carbon beads (i.e., the internal environment side of AB filter 300) and is separated from the first chamber 304 by the sorbent laminate 312, which enables the bead replacement (at blocks 502-504) to be performed without removing the first cover 252, the method or procedure of FIG. 5 can be performed outside of a clean-room environment, thereby advantageously reducing the complexity of the bead replacement/HDD humidity control process.

Physical Description of an Illustrative Operating Context

Embodiments may be used in the context of an electronic data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
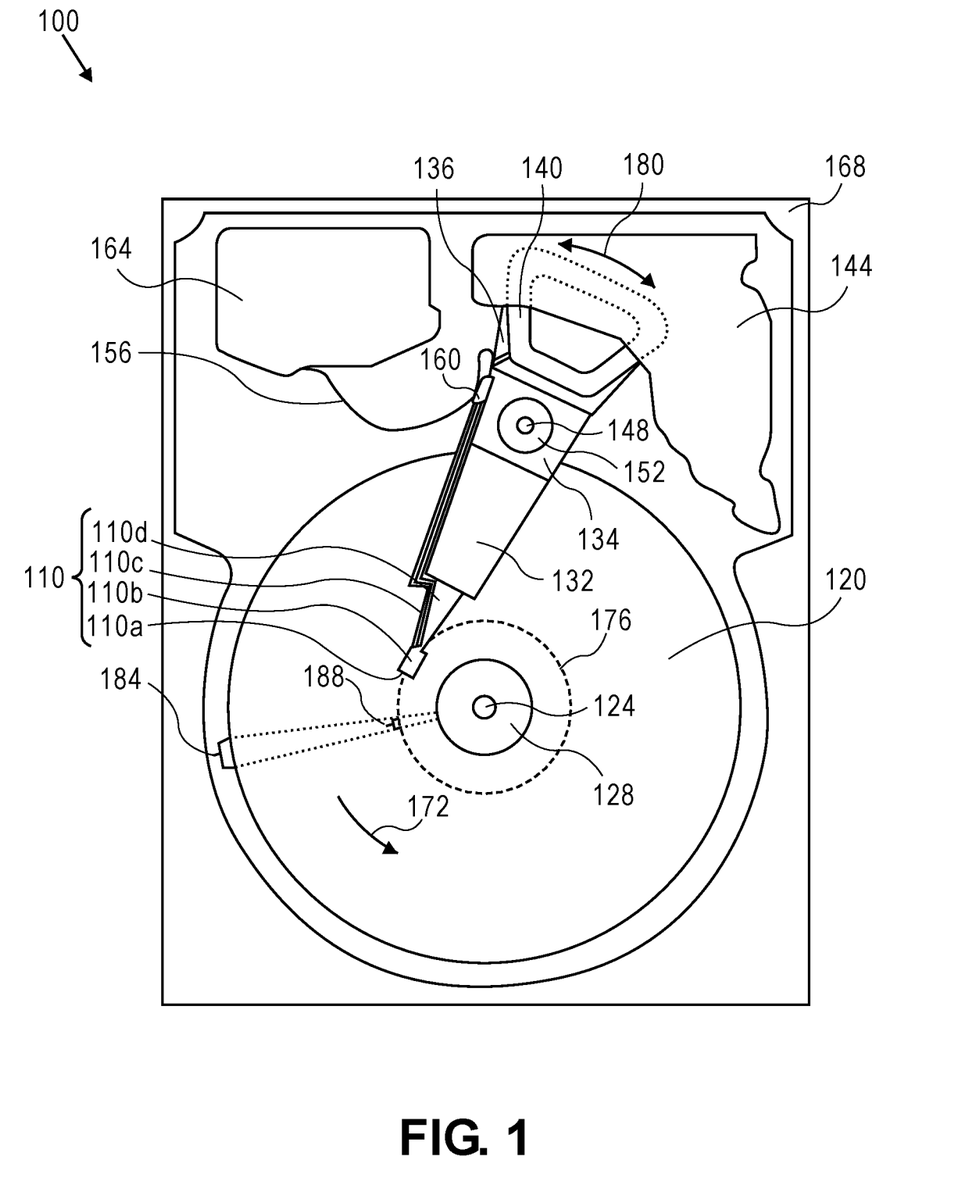
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "motor base assembly" or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive, the hard disk drive comprising:
a plurality of disk media rotatably mounted on a spindle;
a head slider comprising a read-write head configured to write to and to read from a disk medium of the plurality of disk media;
a rotary actuator configured to move the head slider to access portions of the disk medium;
an enclosure comprising a cover coupled with a base and in which the disk medium, the head slider, and the rotary actuator are housed, wherein the cover comprises a breather hole; and
a breather filter positioned within the enclosure and environmentally coupled with an external environment on one side and an internal environment on another opposing side, the breather filter comprising:
a first chamber configured for housing a first sorbent and environmentally coupled with the external environment via at least a first orifice and a second orifice;
a first sorbent in the first chamber;
a second chamber adjacent to the first chamber and configured for housing a second sorbent and environmentally coupled with the internal environment; and
a second sorbent in the second chamber;
wherein:
the first orifice of the breather filter is configured as a through-hole between the external environment and the first chamber such that the first sorbent can be loaded into the first chamber via the breather hole of the cover and the first orifice while the breather filter is installed within the enclosure, and
the second orifice of the breather filter is configured as a grating between the external environment and the first chamber such that the first sorbent cannot move from the first chamber to the external environment via the second orifice while loading the first sorbent into the first chamber while the breather filter is installed within the enclosure.

2. The hard disk drive of claim 1, wherein:
the first sorbent of the breather filter comprises a zeolite material in the form of beads; and
the second sorbent of the breather filter comprises a carbon material in the form of beads.

3. The hard disk drive of claim 1, wherein:
the first sorbent of the breather filter comprises a silica gel material in the form of beads; and
the second sorbent of the breather filter comprises a carbon material in the form of beads.

4. The hard disk drive of claim 1, wherein the first orifice is configured such that the first sorbent can be unloaded from the first chamber via the breather hole of the cover and the first orifice while the breather filter is installed within the enclosure.

5. The hard disk drive of claim 1, wherein the second chamber of the breather filter is adjacent to the first chamber in a direction from the external environment to the internal environment.

6. A sorbent breather filter configured for installation within a hard disk drive, and sorbent loading/unloading while within the hard disk drive and outside of a clean-room environment, the sorbent breather filter comprising:

a first chamber configured for housing a first sorbent and environmentally coupled with an external environment via at least a first orifice and a second orifice;

a first sorbent in the first chamber;

a second chamber adjacent to the first chamber and configured for housing a second sorbent; and a second sorbent in the second chamber;

wherein:
- the first orifice of the breather filter is configured as a through-hole between the external environment and the first chamber and is positioned for alignment with a hard disk drive breather hole such that the first sorbent can be loaded into the first chamber via the first orifice while the sorbent breather filter is installed within the hard disk drive; and
- the second orifice of the breather filter is configured as a slitted-hole between the external environment and the first chamber such that the first sorbent cannot move from the first chamber to the external environment via the second orifice while air flows out from the sorbent breather filter via the second orifice while loading the first sorbent into the first chamber while the sorbent breather filter is installed within the hard disk drive.

7. The sorbent breather filter of claim 6, wherein:
the first sorbent comprises zeolite or silica gel beads; and
the second sorbent comprises carbon beads.

8. A hard disk drive comprising the sorbent breather filter of claim 7.

9. The sorbent breather filter of claim 7, wherein:
the first orifice is configured such that the first sorbent can be unloaded from the first chamber via application of suction to the first orifice while the breather filter is installed within the hard disk drive.

10. The sorbent breather filter of claim 6, wherein the second chamber is adjacent to the first chamber in a direction away from the external environment.

11. The sorbent breather filter of claim 6, further comprising a first sheet filter positioned between the first and second chambers.

12. The sorbent breather filter of claim 11, further comprising a second sheet filter adjacent to the second chamber in a position opposing the first sheet filter.

13. A method of refilling a sorbent breather filter positioned inside a hard disk drive (HDD), the method comprising:

for a sorbent breather filter comprising a first compartment environmentally coupled with an environment external to the HDD via a through-hole in a container of the breather filter and a grate-covered orifice in the container of the breather filter, a first means for adsorbing in the first compartment, a second compartment adjacent to the first compartment and environmentally coupled with an internal environment of the HDD, and a sorbent in the second compartment:
- applying a suction force to the through-hole via a collinear breather hole of an enclosure cover of the HDD, from the environment external to the HDD, to remove the first means for adsorbing from the first compartment; and
- injecting another unit of first means for adsorbing into the first compartment via the through-hole, such that the grate-covered orifice prohibits any of the other unit of first means for adsorbing from moving from the first compartment to the environment external to the HDD via the grate-covered orifice.

14. The method of claim 13, further comprising:
prior to applying the suction force, removing a temporary seal covering the breather in the enclosure cover.

15. The method of claim 13, wherein:
the sorbent breather filter further comprises carbon beads in the second compartment; and
the applying and the injecting are performed external to a clean-room environment.

16. The method of claim 15, wherein the second compartment of the breather filter is adjacent to the first compartment in a direction from the environment external to the HDD to the internal environment of the HDD.

17. The method of claim 15, wherein the sorbent breather filter further comprises a sheet filter positioned between the first and second compartments.

* * * * *